(12) United States Patent
Wood et al.

(10) Patent No.: US 9,309,909 B2
(45) Date of Patent: Apr. 12, 2016

(54) POP-UP SHELVING SYSTEM

(71) Applicant: Opto International, Inc., Wood Dale, IL (US)

(72) Inventors: Graham Robert Wood, Callawassie Island-Okatie, SC (US); Brett A. Woodley, Wilmette, IL (US); Erich Haller, Buffalo Grove, IL (US)

(73) Assignee: OPTO INTERNATIONAL, INC., Wood Dale, IL (US)

( * ) Notice: Subject to any disclaimer, the term of this patent is extended or adjusted under 35 U.S.C. 154(b) by 255 days.

(21) Appl. No.: 13/759,577

(22) Filed: Feb. 5, 2013

(65) Prior Publication Data
US 2014/0217048 A1 Aug. 7, 2014

(51) Int. Cl.
*A47B 43/00* (2006.01)
*F16B 7/20* (2006.01)
*A47F 5/10* (2006.01)
*F16B 21/09* (2006.01)

(52) U.S. Cl.
CPC . *F16B 7/20* (2013.01); *A47F 5/101* (2013.01); *A47F 5/103* (2013.01); *F16B 21/09* (2013.01); *Y10T 403/7075* (2015.01)

(58) Field of Classification Search
CPC ...... A47B 57/04; A47B 57/14; A47B 96/025; A47F 5/0087; A47F 5/101; A47F 5/103; Y10T 29/49826; Y10T 403/7075; F16B 7/20; F16B 21/09
USPC ................................. 211/186, 90.02
See application file for complete search history.

(56) References Cited

U.S. PATENT DOCUMENTS

| | | | |
|---|---|---|---|
| 543,959 A * | 8/1895 | Foster | 108/110 |
| 2,517,284 A | 8/1950 | Calvert | |
| 2,743,980 A | 5/1956 | Hobbs | |
| 2,975,908 A | 3/1961 | Huet | |
| 3,304,108 A | 2/1967 | Lay | |
| 3,561,713 A | 2/1971 | Berkowitz | |
| 3,625,371 A * | 12/1971 | Dill | 211/153 |
| 3,832,957 A | 9/1974 | Mendenhall | |
| 3,892,189 A | 7/1975 | Killam | |
| 3,921,539 A | 11/1975 | Berger | |
| 4,049,355 A | 9/1977 | Kawazu | |
| 4,124,322 A | 11/1978 | Parisien | |
| 4,132,390 A | 1/1979 | Pfarr, Jr. | |
| 4,165,588 A * | 8/1979 | Bayley | 52/36.5 |

(Continued)

OTHER PUBLICATIONS

Written Opinion and International Search Report for related patent PCT application No. PCT/US13/62297 dated Feb. 24, 2014.

(Continued)

*Primary Examiner* — Korie H Chan
(74) *Attorney, Agent, or Firm* — Husch Blackwell LLP (57) ABSTRACT

The subject invention comprises a modular, pop-up shelf display system that includes vertical slotted shelf support posts, horizontal tie bars, and shelf or accessory members. Two slotted support posts are connected at the top and bottom ends by a pair of tie bars; the top of each slotted support post leans against a wall. Shelves or accessories, which include brackets that engage the slots in the vertical support posts are then attached to the support posts to form horizontal shelves or accessories between the support posts at desired heights and orientation. The system includes internal connectors positioned inside the post ends and the ends of the tie bars which secure the tie bars to the posts to secure the posts in an upright manner against the wall.

13 Claims, 8 Drawing Sheets

(56) References Cited

U.S. PATENT DOCUMENTS

| | | | |
|---|---|---|---|
| 4,437,572 A | 3/1984 | Hoffman | |
| 4,552,271 A * | 11/1985 | Kranz | A47J 47/14 108/27 |
| 4,573,288 A | 3/1986 | Adell | |
| 4,606,170 A | 8/1986 | Mendenhall | |
| 4,610,491 A * | 9/1986 | Freeman | 312/291 |
| 4,709,522 A | 12/1987 | Carnahan | |
| 4,785,939 A * | 11/1988 | Huerto | B42F 7/12 108/190 |
| 5,071,281 A | 12/1991 | Murphy et al. | |
| 5,102,254 A | 4/1992 | Yeh | |
| 5,159,793 A * | 11/1992 | Deugo et al. | 52/126.1 |
| 5,313,754 A | 5/1994 | Jensen | |
| 5,415,472 A * | 5/1995 | Brise | 312/257.1 |
| 5,605,238 A | 2/1997 | Jacobs | |
| 5,715,957 A * | 2/1998 | Merl | 211/187 |
| 6,021,908 A | 2/2000 | Mathews | |
| 6,161,488 A | 12/2000 | Reddicliffe | |
| 6,168,032 B1 | 1/2001 | Merl | |
| 6,220,684 B1 * | 4/2001 | Bent et al. | 312/405.1 |
| 6,318,293 B1 | 11/2001 | Cranfill et al. | |
| 6,357,609 B1 | 3/2002 | Van Noord et al. | |
| 6,585,118 B2 | 7/2003 | Kellogg | |
| 6,786,017 B2 | 9/2004 | Thompson | |
| 7,249,680 B2 * | 7/2007 | Wang | 211/37 |
| 7,357,469 B2 * | 4/2008 | Ertz | 312/408 |
| 7,950,706 B2 | 5/2011 | Shaw et al. | |
| 8,783,476 B2 * | 7/2014 | Woodley et al. | 211/183 |
| 8,915,561 B2 * | 12/2014 | Eichman et al. | 312/408 |
| 2001/0014250 A1 | 8/2001 | Plummer et al. | |
| 2001/0047975 A1 | 12/2001 | Lazas et al. | |
| 2002/0164208 A1 | 11/2002 | Koelfner | |
| 2006/0163976 A1 * | 7/2006 | Matus | 312/140.4 |
| 2007/0023376 A1 | 2/2007 | Black | |
| 2007/0251426 A1 | 11/2007 | Li | |
| 2008/0217505 A1 | 9/2008 | Cohoon | |
| 2008/0217506 A1 | 9/2008 | Cohoon | |
| 2009/0267461 A1 | 10/2009 | Salloum et al. | |
| 2010/0045149 A1 * | 2/2010 | English et al. | 312/140.4 |
| 2010/0090567 A1 | 4/2010 | Felice | |
| 2011/0068071 A1 | 3/2011 | Suman et al. | |
| 2012/0145662 A1 | 6/2012 | Geng | |

OTHER PUBLICATIONS

International Preliminary Report on Patentablility regarding related international application PCT/US2013/062297, issued Aug. 11, 2015 (8 pgs).

* cited by examiner

POP-UP SHELVING SYSTEM

FIELD OF INVENTION

This application relates to a modular shelving system for use in retail sales, and more particularly to a shelving system which is easily assembled and disassembled while maintaining a high degree of stability and support.

BACKGROUND OF THE INVENTION

In recent years a new type of retail sales store has evolved. At different seasonal times of the year, or for other reasons, a "pop-up" store or other event driven opportunities may open for a limited period of time to sell holiday related items or other specific goods. It is important for such stores to quickly and easily set up and open, and then knock down and close. Traditional shelves and other display fixtures can be difficult and time-consuming to assemble and disassemble. Therefore, there is a need for shelving and display fixtures that can be easily set-up and quickly taken down without leaving holes or nail marks in the walls.

Accordingly, one of the benefits of the subjection invention is a shelf assembly that may be easily and quickly assembled and disassembled by unskilled labor, with no tools.

A further benefit of the subject invention is a shelf assembly that has shelves with adjustable heights, and orientation.

A still further benefit of the subject invention is a shelf assembly that has interchangeable and common parts for easier assembly and less expensive manufacture.

SUMMARY OF THE INVENTION

The subject invention comprises a modular, pop-up shelf display system that includes vertical slotted shelf support posts, horizontal tie bars, and shelf or accessory members. Two slotted support posts are connected at the top and bottom ends by a pair of tie bars; the top of each slotted support post leans against a wall. Shelves or accessories, which include brackets that engage the slots in the vertical support posts are then attached to the support posts to form horizontal shelves or accessories between the support posts at desired heights and orientation. The system includes internal connectors positioned inside the posts ends and the ends of the tie bars to secure the posts in an upright manner against the wall. A free standing shelf system is also envisioned utilizing the slotted support posts, joined by a pair of tie bars.

CONCISE DESCRIPTION OF THE DRAWINGS

These and other benefits, features and advantages of the present invention will become apparent to those skilled in the art from the following description and the accompanying figures illustrating preferred embodiment of the invention.

FIG. 10(*a*) is a cross-sectional view along the lines A-A of FIG. 10(*b*).

FIG. 10(*b*) is a plan view of the inner side of cam lock insert of the subject invention.

DETAILED DESCRIPTION OF THE INVENTION

Figure 1:
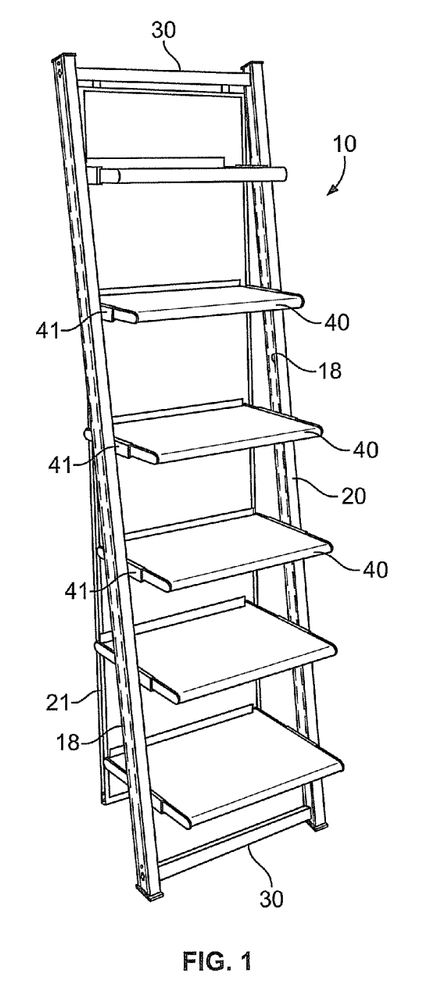
FIG. 1 is a perspective view of one embodiment of the shelf assembly of the subject invention.
Figure 2:
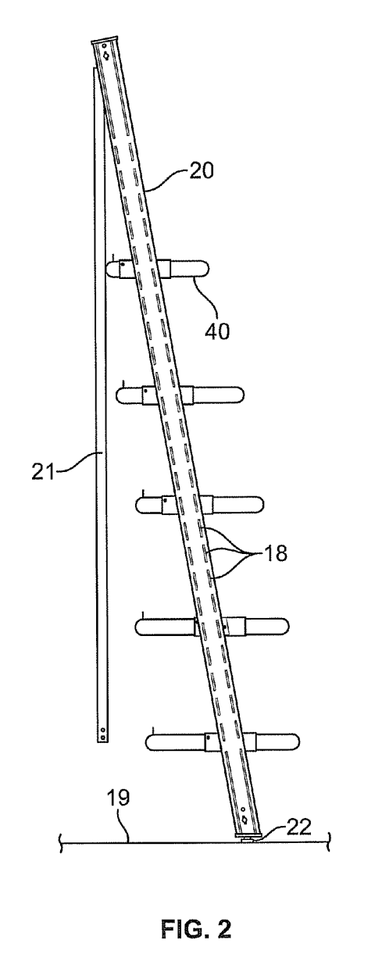
FIG. 2 is a side view of the shelf assembly of FIG. 1.

Referring now to FIGS. 1 and 2 there is shown shelf assembly 10 having vertical support posts 20. The supports 20 are secured together in spaced relation by tie rods 30 at an upper and lower location of the shelf assembly 10. Shelves 40 or other accessories, such as hanger rods 17 (FIG. 3), are secured between the vertical supports 20 by brackets 41 on either side of the shelf. Back panel 21 may be a laminated board and serves as a decorative backdrop for the products displayed on the shelf. As such back panel 21 may have decorative designs, as desired. Back panel 21, as best seen in FIG. 2, does not support the shelf assembly, nor does it touch the floor 19.

Figure 3:
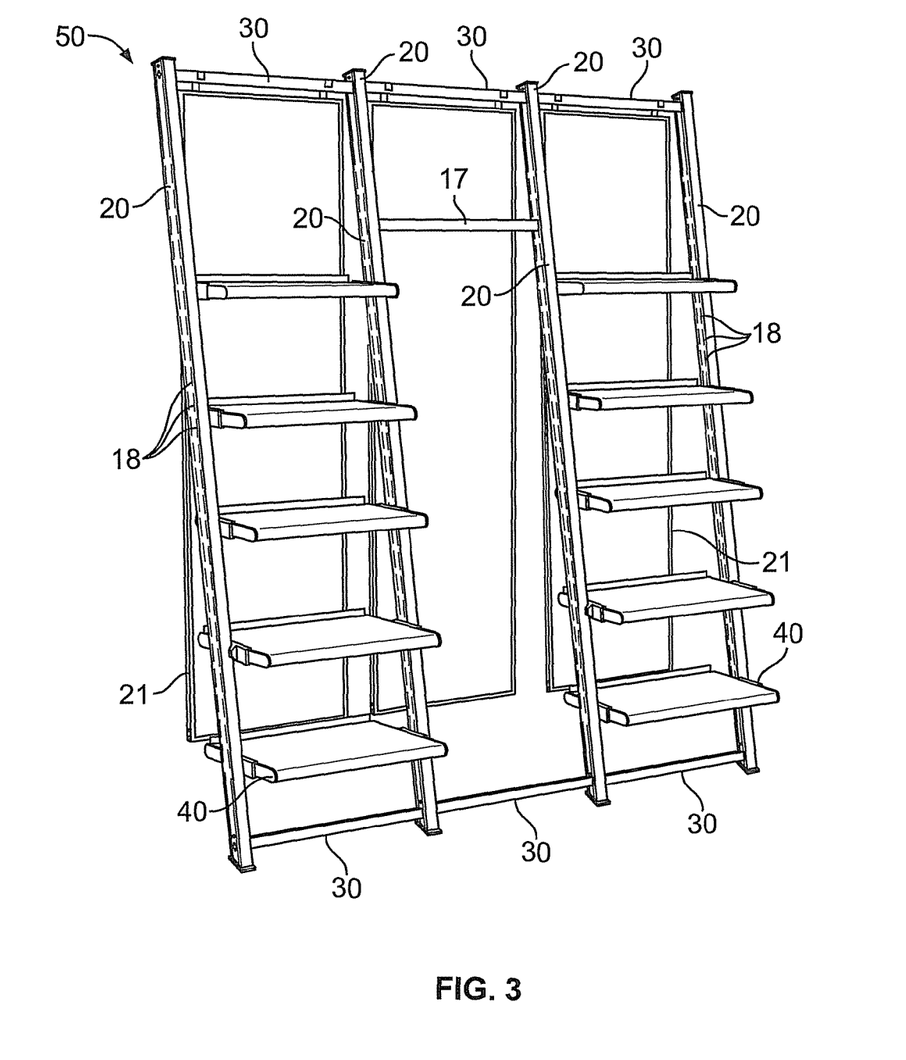
FIG. 3 is a perspective view of a shelf assembly of the subject invention, showing a multi section shelf assembly.

The vertical support posts 20 lean against the wall at approximately a 10° to 20° angle, and preferably 10°. Each vertical support may have a non-skid foot 22. FIG. 3 shows another embodiment where the shelf assembly 50 is a multi-unit assembly, having interlinked upright supports 20 with tie rods 30 between and connected to adjacent vertical supports 20. Vertical support 20 has two opposing sides with channel slots 18 along the length of the vertical support. These channel slots 18 support the shelves in a manner to be described.

FIG. 3 shows a shelf assembly of the subject invention with multiple sections one of which may support hanger rods 17 or other accessories. As each support post 20 has identical slots and other openings on opposing sides, additional sections can be added without the need for different parts fasteners or tools, thereby contributing to the low cost of equipment and ease of assembly.

Figure 4:
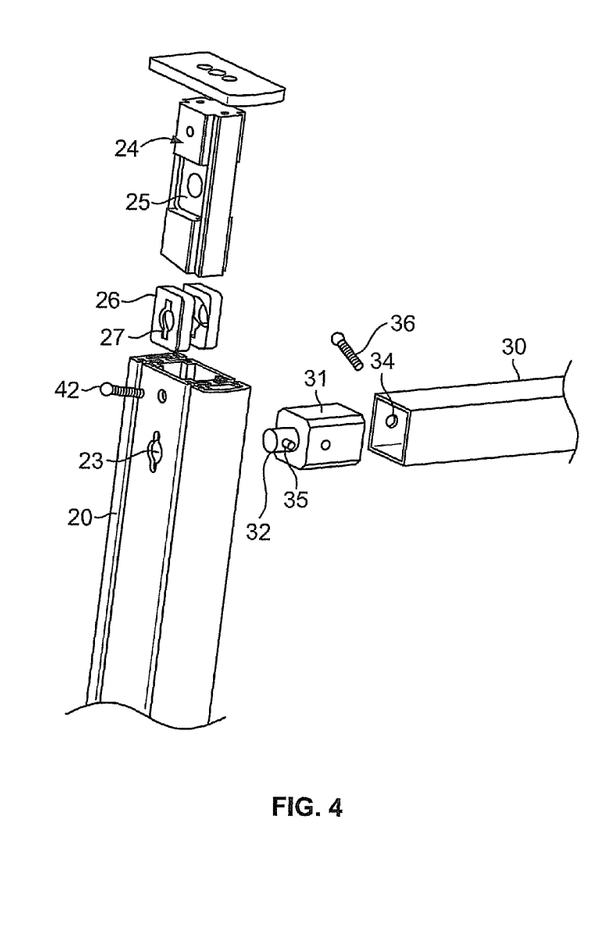
FIG. 4 is a perspective view of the top portion of a support post with the post insert in an exploded view

FIG. 4 shows the manner of connection of a tie rod 30 to a support post 20. Tie rod insert 31 fits snuggly inside the hollow end of the tie rod 30 and is secured there by pin or screw 36 which is inserted through opening 34 of the tie rod into the insert 31. On an outer end of insert 31 is a peg 32 having oppositely positioned pins 35 extending transverse to the longitudinal axis of peg 32 and tie rod 30.

Figure 10A:
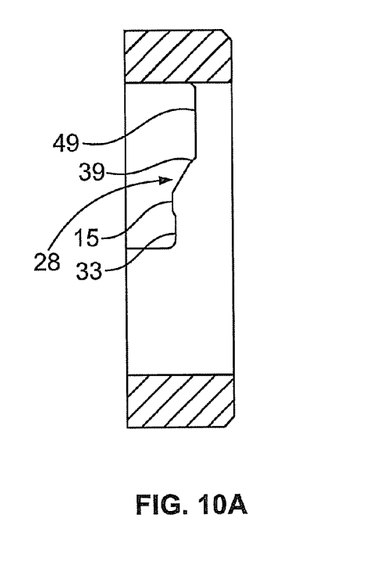
Figure 10B:
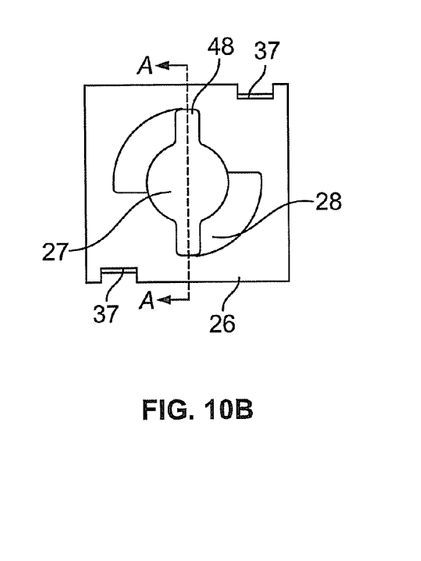

As best seen FIGS. 10(*a*) and 10(*b*), cam lock insert 26 has a central opening 27 with opposing peripheral wing openings 48 on an outer side, and on an inner side cammed surfaces 28. The cammed surfaces comprise an inclined surface as shown in FIG. 10(*a*). At the start of the inclined plane is a level surface 49 which leads to helical inclined plane 39 and afterwards depression 33 which holds or locks the pins 35 in position.

Figure 5:
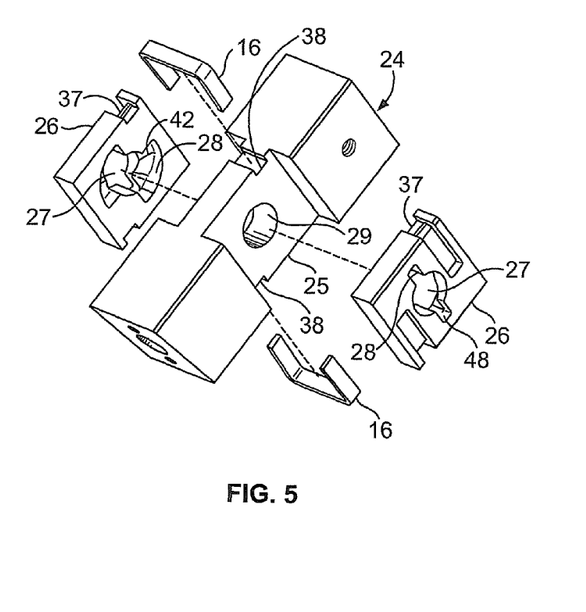
FIG. 5 is an exploded view of a support connector insert of the shelf assembly of FIG. 1.

Situated inside hollow vertical support is support insert block 24, better seen in FIG. 5. Support insert block 24 is sized to fit snuggly inside the hollow end of support post 20 and secured there by a screw or other fastener 42. Insert 24 has a channel or recess 25 into which cam lock insert 26 is located on opposite sides of the insert block 24. Each cam lock 26 has a groove or channel 37 that lines up with a similar channel 38 on the insert, so as not to block openings 27 and 29. In use, the cam locks are placed into the channel and locked in place by the use of spring clip 16 in grooves 37 and 38. The insert 24, with cam locks secured, are then placed into the hollow ends of the support post 20. A tie rod 30 aligns the peg 32 and pins 35 for insertion into and through the central opening 27 of cam lock 26. The tie rod 30 is rotated, causing the pins 35 to engage the cammed surfaces 28, go over the slight ridge 15, into the depression 33, pulling the tie rod into the support post and locking the tie rod into position.

Figure 6:
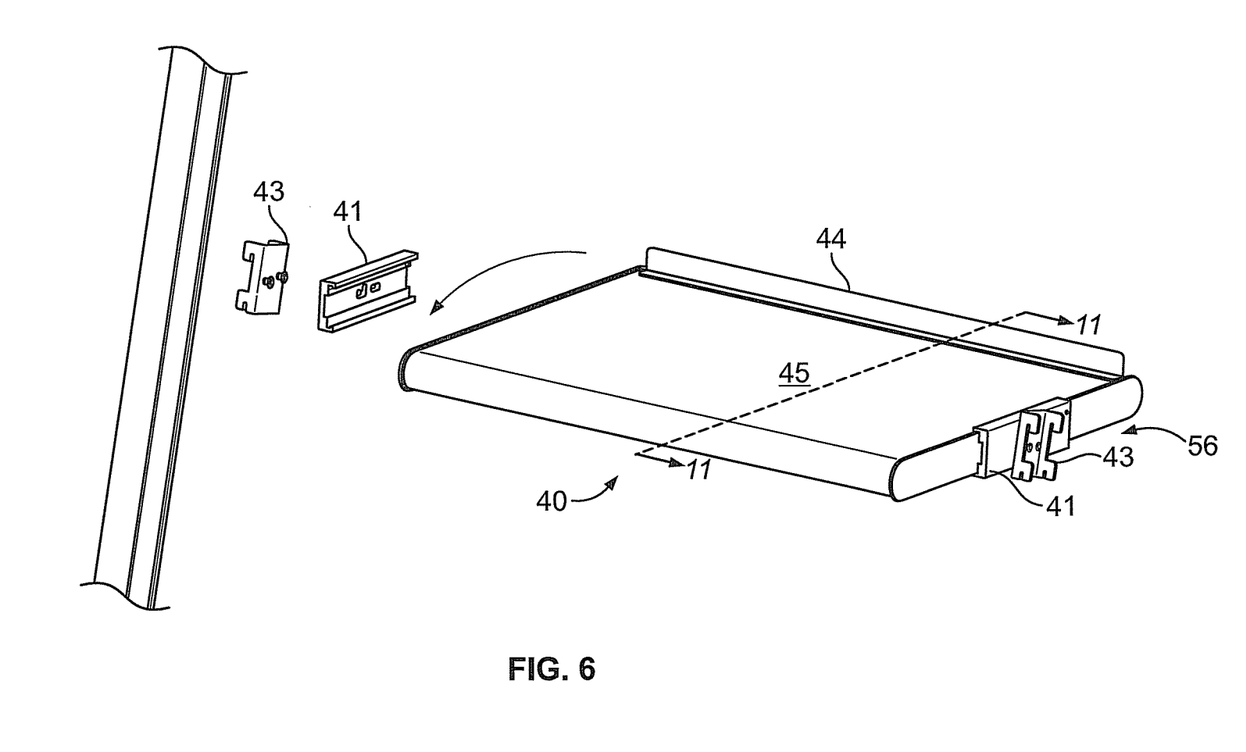
FIG. 6 is an exploded view of a shelf bracket assembly of the subject invention.
Figure 7:
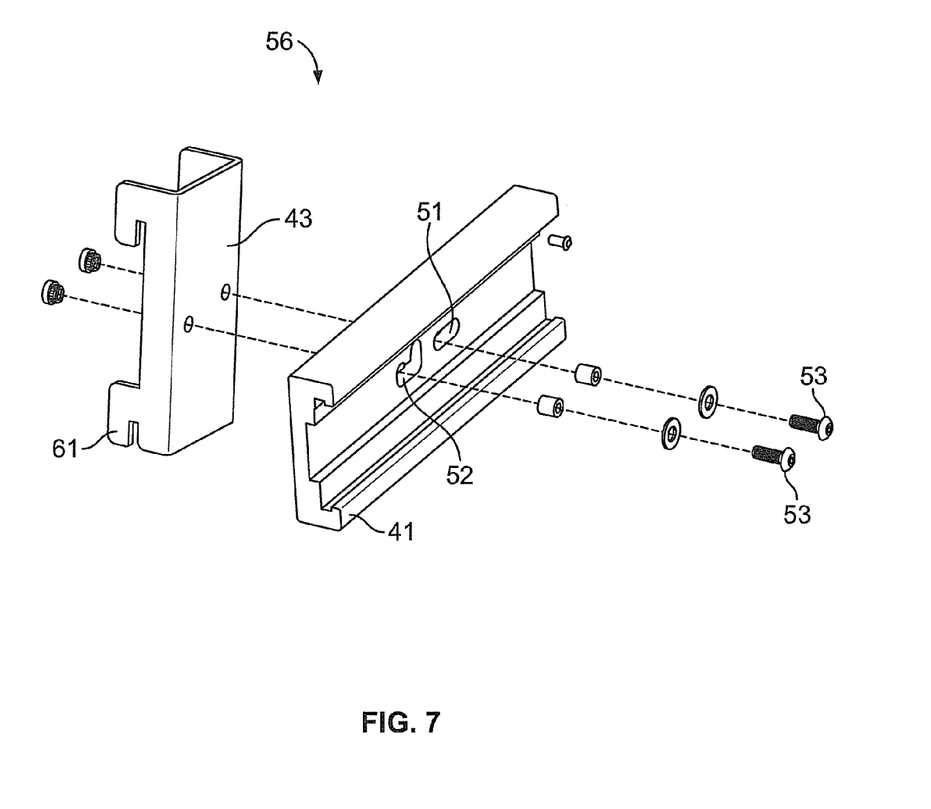
FIG. 7 is an exploded view of a connector assembly for a shelf of the subject invention.

The shelf assembly 40 is shown in FIGS. 6 and 7. Shelf assembly 40 comprises shelf panel 45, accessory support assembly 56 and shelf ledge 44. Accessory support assembly 56 includes shelf support brackets 43 and left and right accessory support brackets 41. Bracket 41, as shown in FIG. 7 has openings 51 and 52. Opening 51 can be a straight slot, while opening 52 may be an L shaped slot having a vertical component and a lower horizontal component. The horizontal component has an enlarged region at the closed end. When the bracket is installed on the shelf sides as in FIG. 6, the bracket angle relative to the shelf can be changed from about 15° to 0° selectively by placement of the fasteners 53 in either extremities of the respective slots. The fasteners 53 secure the bracket 43 to support bracket 41, which may be secured to support posts by insertion of hooks 61 into slots 18 on the support posts. The accessory support brackets 41 slide onto and hold the shelf panel 45 or at the desired angle. The shelf orientation may be reversed to position the shelf ledge at the front of the assembly as desired. Other means for securing the shelf to the support posts while allowing different angled attachments may be used, such as that shown in U.S. Pat. No. 5,749,480.

Figure 11:
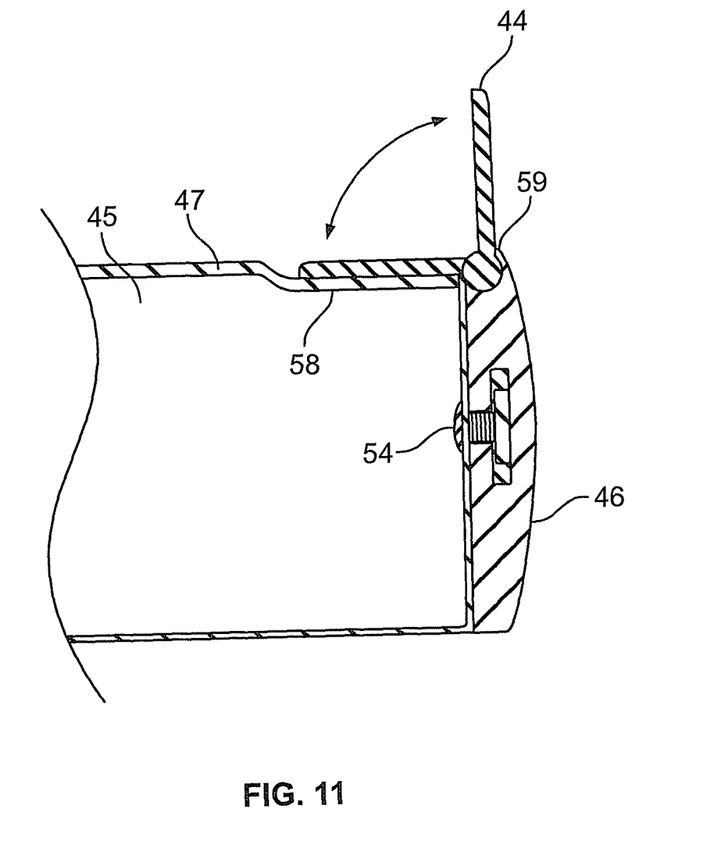
FIG. 11 is a cross-section of the shelf of FIG. 6 of the subject invention, showing the pivoting shelf ledge.

Shelf ledge 44 may also be hinged to allow movement from a first upward vertical position to a second downward vertical position. As shown in FIG. 11, the shelf ledge 44 may pivot at one end to allow such movement. The shelf ledge would be pivoted to the upward vertical position when the shelf itself was in an angled position, so that objects placed on the shelf cannot roll or otherwise fall off. When the shelf was level or in a horizontal position, the shelf ledge would be pivoted to the downward vertical position and out of the way. In the embodiment of FIG. 11, the shelf panel 45 is enclosed in a monolithic shell, preferably of sheet metal 47. An end panel 46 is secured to the shell 47 by a screw 54 or other fastener which may be self-tapping or engage an embedded nut as shown. Shelf ledge 44 pivotally secured to an upper end of panel 46 so it can pivot from the raised position to the lowered position, as indicated by the arrow. The lowered position may include a recess 58 in the shelf to provide a substantially flat shelf surface, while allowing the shelf ledge to pivot from a substantially horizontal position to a substantially vertical position. Stop 59 may be formed in end panel to restrict the maximum pivotal movement of the shelf ledge 44 to a 90° position from horizontal, i.e., substantially vertical.

Figure 8:
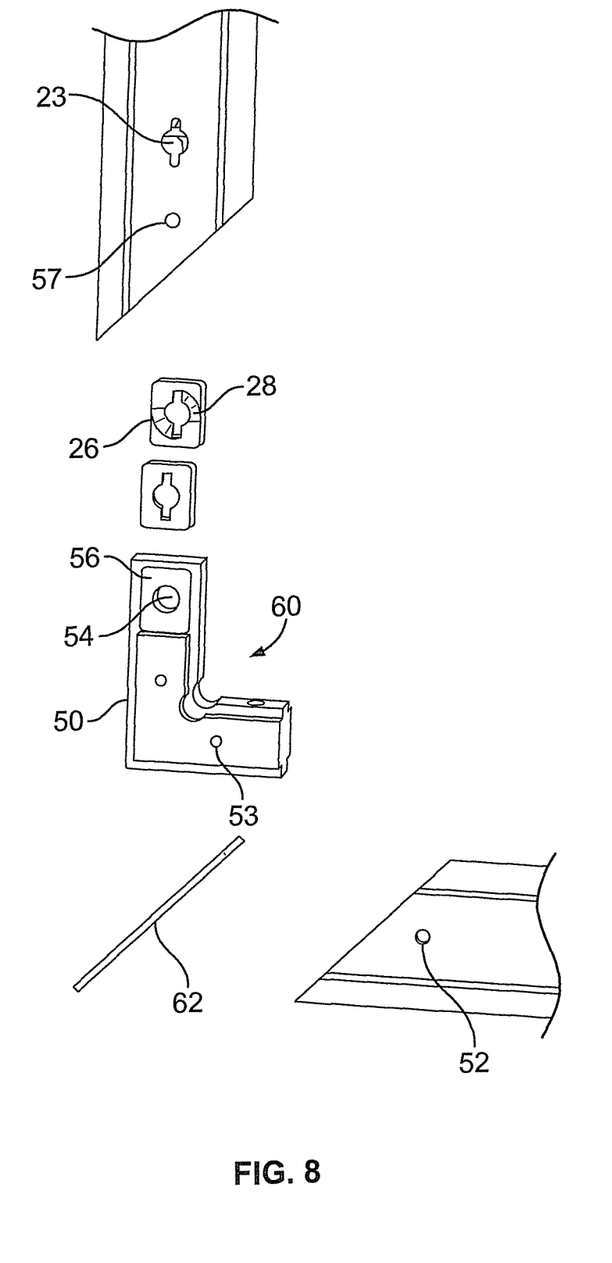
FIG. 8 is an exploded view of a free standing assembly according to the subject invention.
Figure 9:
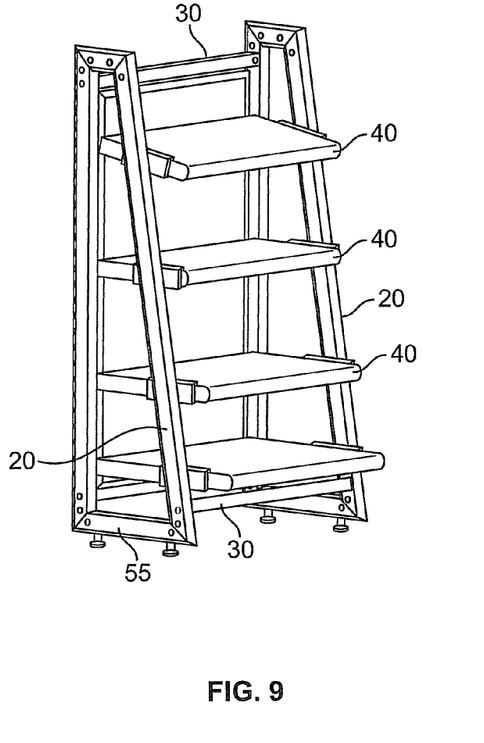
FIG. 9 is a perspective view of a free-standing shelf assembly according to the subject insertion.

In the event a free standing unit was desired, a trapezoid shaped assembly may be used with mitered corners as shown in FIG. 9. A connector assembly similar to that in FIGS. 4 and 5 may be used. As shown in FIG. 8, lower support rail 55 is attached to support posts 20 at opposite ends by angled connector assemblies 60. Similar to insert 24 in FIGS. 4 and 5 both cam lock inserts 26 are seated in recess 25 so that the camming surface 28 is facing the interior. With the cam locks seated in the recess, the right angle connector assemblies are inserted into the hollow ends of both support posts 20 and support rail 55. Screws or pins (not shown) are inserted into holes 57 and 52 to secure the support post 20 and support rail 55 together. A spacer 62 may be used between the support post 20 and support rail 55. A similar construction may be used to attach the upper support rail to the top end of the support post. The same structure is then used to construct the opposite side. A tie rod 30 is then used to connect the two structures at the upper end and the lower end in the same manner as described above. Thus, the tie rod 30 is inserted into opening 23 in both left and right support posts, taking care the peg 32 and pins 35 (FIG. 4) enter the central opening 27 of cam lock 26, with the pins inserted through wing openings 48. The tie rod 30 is then twisted to bring the pins 35 into contact with the camming surface 28 and then locked in position as the pins overcome ridge 15 and seats in the depression 33. Shelves are secured to support posts in a manner similar to the wall leaning shelf described above.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

We claim:

1. An easy to assemble shelving system, comprising two support posts each having a bottom end for contact with a floor and an upper end for contact with a wall;
   said support posts holding a plurality of shelves or accessories;
   an upper tie rod and a lower tie rod;
   each of said upper tie rod, and said lower tie rod having first hollow ends and a first connector block in each of said first hollow ends;
   said two support posts being spaced from each other by said upper tie rod and said lower tie rod and having a second hollow end in each support post with a second, connector block in each of said second hollow ends;
   each of said first connector blocks having a locking pin, said support posts each having an upper opening and a lower opening whereby each of said locking pins engage a one of said second connector blocks through the respective opening for locking said tie rod with said support post.

2. The shelving system of claim 1 wherein said first connector block includes an insert having a camming surface for engagement with said locking pins.

3. The shelving system of claim 2 wherein said camming surface has an inclined surface followed by a depression for locking said locking pins in place.

4. The shelving system of claim 1, further including a back panel that does not touch the floor.

5. The shelving system of claim 1, wherein said first connector block has a peg at an outer end thereof;
   said locking pin comprises a first pin and a second pin;
   said peg having said first pin and said second pin on opposite sides of said peg;
   said upper and lower openings each comprising a first and a second opening through to a hollow interior of each support post respectively;
   said first and second opening each having two opposing wing openings;
   a locking insert secured within the hollow interior of each of the support posts;
   said locking insert having a third opening for alignment with said opening;
   a camming lock within the hollow interior of the support post having a fourth opening alignable with said first and second openings;
   whereby the peg is inserted through said first, second and third openings and said first and second pins engage said camming lock to lock said tie rod to said support post.

6. The shelving system of claim 1 wherein each of said support posts having receiving structures, said shelf or accessory having holding devices for engagement with said receiving structures and retention of said shelf or accessory between said support posts, said holding devices permitting the retention of said shelf at a desired angle.

7. The shelving system of claim 6 wherein said receiving structures are slots in said support posts and said holding device comprises hooks engageable with said slots.

8. The shelving system of claim 6 wherein said holding devices comprise a bracket having two notches, a first notch being an oval and a second notch being an L-shaped notch, said L-shaped notch having an upper end and a lower end, whereby a fastener can be positioned in said first notch and in either of said upper end or said lower end of said second notch to determine an angle at which the shelf is retained between said support posts.

9. The shelving system of claim 1 wherein said shelves or accessories comprise a shelf;
   said shelf having opposing sides;
   said shelf having an end panel attached to a first opposing side;
   said first opposing side having a ledge secured to said end panel and which is reciprocally pivotal from a substantially horizontal position to a substantially vertical position;
   said end panel having a stop to limit the pivotal movement of said ledge to said substantially vertical position from said substantially horizontal position.

10. The shelving system of claim 9 wherein said shelf comprises a recessed area.

11. The shelving system of claim 9 wherein said shelf is encased in a monolithic shelf, and said end panel is attached to said shelf.

12. A connection system, comprising a connecting block for insertion into a hollow end of a lateral support element;
   said connecting block having a peg at an outer end thereof;
   said peg having said first pin and said second pin on opposite sides of said peg;
   a vertical support element having a first opening through to a hollow interior of the vertical support element;
   said first opening having two opposing wing openings;
   a locking insert within the hollow interior of the vertical support element;
   said locking insert having a second opening for alignment with said first opening;
   a camming lock within the hollow interior of the vertical support element having a third opening aligned with said first and second opening;
   whereby the peg is inserted through said first, second and third openings and said pins engage said camming lock to lock said lateral support element said vertical support element.

13. The connection system of claim 12 further including a shelf or accessory supported between two vertical support elements.

* * * * *